United States Patent [19]
Weingart et al.

[11] Patent Number: 4,869,761
[45] Date of Patent: Sep. 26, 1989

[54] FILAMENT WINDING PROCESS

[75] Inventors: Oscar Weingart, Riverside; Gerald A. Lunde, Norco; Clark D. Taylor, Riverside, all of Calif.

[73] Assignee: Rohr Industries, Inc., Chula Vista, Calif.

[21] Appl. No.: 97,696

[22] Filed: Sep. 17, 1987

Related U.S. Application Data

[62] Division of Ser. No. 855,638, Apr. 25, 1986, abandoned.

[51] Int. Cl.⁴ .............................................. B65H 81/00
[52] U.S. Cl. ..................................... 156/175; 156/169
[58] Field of Search ............... 156/169, 161, 171, 162, 156/172, 173, 175, 180, 425, 429, 430, 433, 446, 447, 363, 441; 242/7.01, 7.02, 7.21

[56] References Cited

U.S. PATENT DOCUMENTS

| | | | |
|---|---|---|---|
| 3,112,234 | 11/1963 | Krupp | 156/169 |
| 3,189,510 | 6/1965 | Eldred | 156/189 X |
| 3,617,414 | 11/1971 | Wesch | 156/169 |
| 3,629,028 | 12/1971 | McLarty | 156/196 X |
| 3,775,219 | 11/1973 | Karlson et al. | 156/363 |
| 4,461,669 | 7/1984 | Dontscheff | 156/486 X |

FOREIGN PATENT DOCUMENTS

WO84/00351 2/1984 PCT Int'l Appl.

Primary Examiner—Michael W. Ball
Assistant Examiner—Geoffrey L. Knable
Attorney, Agent, or Firm—Patrick J. Schlesinger; Frank D. Gilliam

[57] ABSTRACT

A filament winding payoff unit and process for applying strands of adhesive impregnated filament material arranged into a gap-free band to a rotating mandrel. A plurality of side-by-side slightly overlapped impregnated filament strands are passed over bars between tines of combs for positioning when leaving the payoff head. The payoff head is positionable toward and away from the rotating mandrel to allow for mandrel longitudinal dimension changes while maintaining the payoff head roller in contact with the mandrel at a predetermined pressure thereagainst. The payoff head is also freely pivotable horizontally to maintain a proper angle of filament application to any changing mandrel longitudinal configuration.

37 Claims, 4 Drawing Sheets

FILAMENT WINDING PROCESS

This is a division, of application Ser. No. 06/855,638, filed 04/25/86, now abandoned.

BACKGROUND OF THE INVENTION

This invention is directed to fibrous-reinforced plastic material, in particular a process for fabricating composite structures from fiber-reinforced plastic material and to an apparatus for effecting this process.

Plastic materials reinforced with fibers, especially glass fibers, have achieved considerable commercial importance. The remarkable strength properties of bodies comprising continuous fibers of filaments enclosed in a matrix of resinous material are exploited in the process known as filament winding, in which the reinforcement consists of filamentous non-metallic or metallic materials in fibrous or tape form. Fibers other than glass have been recently used for filament winding. Typically, these include fibers formed from carbon, boron, silicon carbide, graphite, silicon nitride, alumina or metals including glass coated wires. The windings generally comprise continuous, side-by-side aligned fiber strands impregnated with a resin composition which may be applied as a viscous liquid or as a thin continuous film and then partially cured or "B" staged.

Present apparatus employed for this purpose provides many undesirable characteristics, such as, uneven positioned windings, gaps between the filaments of the windings, changes of tension between the filaments and mandrel with changes in mandrel contour, to name a few.

The present invention overcomes or improves many of the inadequate characteristics of the present state of the art which results in an improved article.

SUMMARY OF THE INVENTION

The present invention provides a unique payoff unit for a filament winding machine and process for forming articles on a rotating mandrel. A plurality of impregnated filaments called "roving" or "tow" are fed through a plurality of comb and smooth bar combinations wherein the filaments are tensioned, flattened, and guided into a "shingled" or slightly overlapped relationship as they are applied to the rotating mandrel. Uniform tension of the applied strands is maintained by the plurality of tension bars. To enable the head to follow the longitudinal contour of the mandrel a piston actuated by pneumatic, hydraulic, electric or the like positions the head with respect to the cross-feed arm of the machine to maintain contact between the payoff roller of the head and the mandrel outer surface. Further the payoff roller is pivotly connected to the payoff head in a manner which allows horizontal pivoting of the payoff roller for applying even pressure to the surface of the mandrel regardless of the mandrel's longitudinal contour configuration. As the shingled or slightly over-lapped tows leave the forming combs and smooth bars, and payoff roller, a continuous thermoplastic tape or paper strip is applied to their upper surface between the tow and payoff roller to maintain their overlapped position integrity and to prevent sticking to the payoff roller while being applied to the mandrel. This tape or paper strip is removed manually or by other convenient means after the filaments are applied to the mandrel surface (typically about one-half of the mandrel rotation). A manifold is positioned below the forming combs, and plain bars and payoff roller, for applying hot air through a plurality of ducts or tubes toward the moving filaments or tows to reduce the viscosity of the resin which reduces fiber drag and "fuzzing" as it passes through the payout head and improves wet-out.

An object of this invention is to provide a gap-free continuous band of filaments to a rotating mandrel.

Another object of this invention is to provide a movable payoff head that substantially follows the mandrel longitudinal contour, thus minimizing unsupported band length between the payoff head and mandrel.

Still another object of this invention is to apply a thermoplastic film or paper release strip to the filaments as they leave the payoff head to insure that their shingled or overlapped relative positions are maintained while being applied to the mandrel and prevent fiber "wrap around" at the final payoff roller.

Yet another object of this invention is to provide a horizontally pivotal payoff roller which follows any changing contour of the mandrel thereby providing an even contact pressure across the surface of the payoff roller.

The various objects and features of the invention will be fully understood from the following detailed description of the typical preferred forms and applications of the invention, throughout which description reference is made to the accompanying drawings, in which:

DETAILED DESCRIPTION

Figure 2:
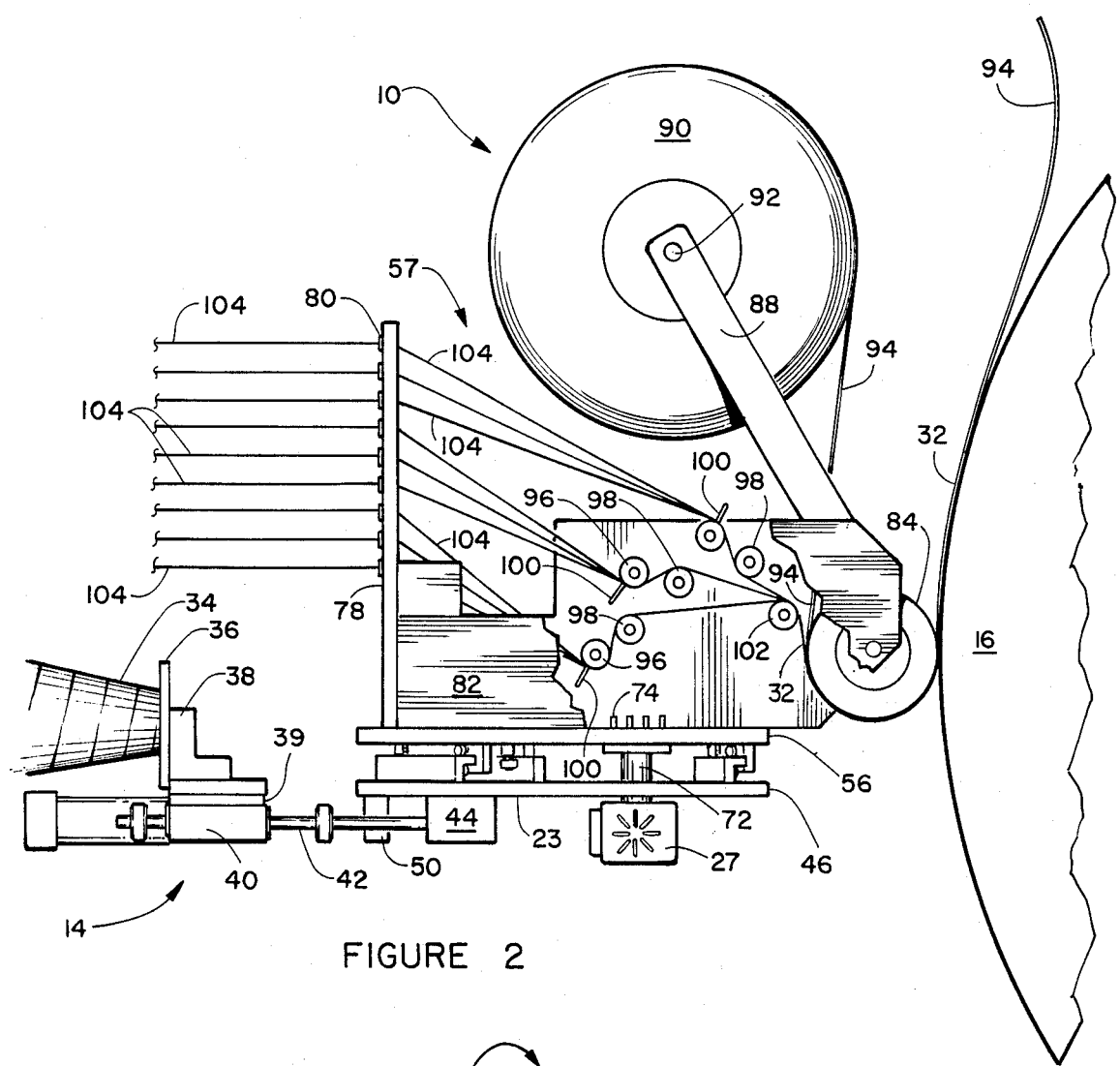
FIG. 2 is a side schematic showing of the payoff head of FIG. 1.

Referring now specifically to drawing FIG. 1, there is shown a payoff head 10 interconnected to an actuatable rod interconnected to a cross-fed arm 14 hereinafter discussed. A mandrel 16 is suspended along its longitudinal axis by means of axles 18 and 20. Axle 18 is supported by bearing 22 rotatably attached to a stanchion or trunion 24 affixed to a support surface 26. Axle 20 is driven by a motor means (not shown) contained in stanchion housing 28. Like stanchion 24 stansion 28 is affixed to support surface 26. The mandrel is rotated along the direction of arrow 30 (upwardly away from the payoff head 10). The combined impregnated filament strands form a web or belt 32 formed by a plurality of overlapped resin impregnated filament strands (hereinafter explained in detail) which is wound about the mandrel and when the resin is cured form a hollow mandrel shaped structure.

Referring now to FIGS. 2-5. FIG. 2 is a schematic showing of the winding system employing the invention. On the left side of FIG. 2, a cross-head feed arm 14 is shown. Typically the cross-feed arm 14 is translatable, perpendicular to the mandrel 16, and rotatable along its mandrel perpendicular axis. Any type of conventional cross-feed arm having these functions may be employed to practice this invention. Generally the operation of the cross-head feed arm is computer controlled.

Attached to the outer distal end of the cross-head feed arm 14 is a plate 36 supporting an attachment "L" bracket. 38 Attached to "L" bracket 38 is a support plate 39. Attached to bracket 38 is an actuator 40. The actutor may be of any type, as for example hydraulic, pneumatic, electric, etc. with a translatable piston (not shown) within the actuator, attached to a rod 42. The distal end of rod 42 is attached to mount 44 which is attached by welding or the like to plate 46. The plate 46 is further supported by rods 48 (see FIG. 4) positioned on each side of rod 42. The ends of rods 48 adjacent to the distal end of rod 42 are attached to plate 46 in the same manner as rod 42. The opposite ends 49 of rods 48, the ends adjacent to bracket 38, are sliding attached to bracket 39 by means of a pillow block 50 with close rod fitting bushings 52. These additional rods 48 stabilize plate 46 and its attachments relating to support plate 39 when the plate is translated relative to support plate 39. The ends of the rods 48 adjacent to bracket 38 are equipped with a stop ring 54 to limit the travel of plate 46. The stop ring maintains the rods 48 in the pillow block 50.

Figure 3:
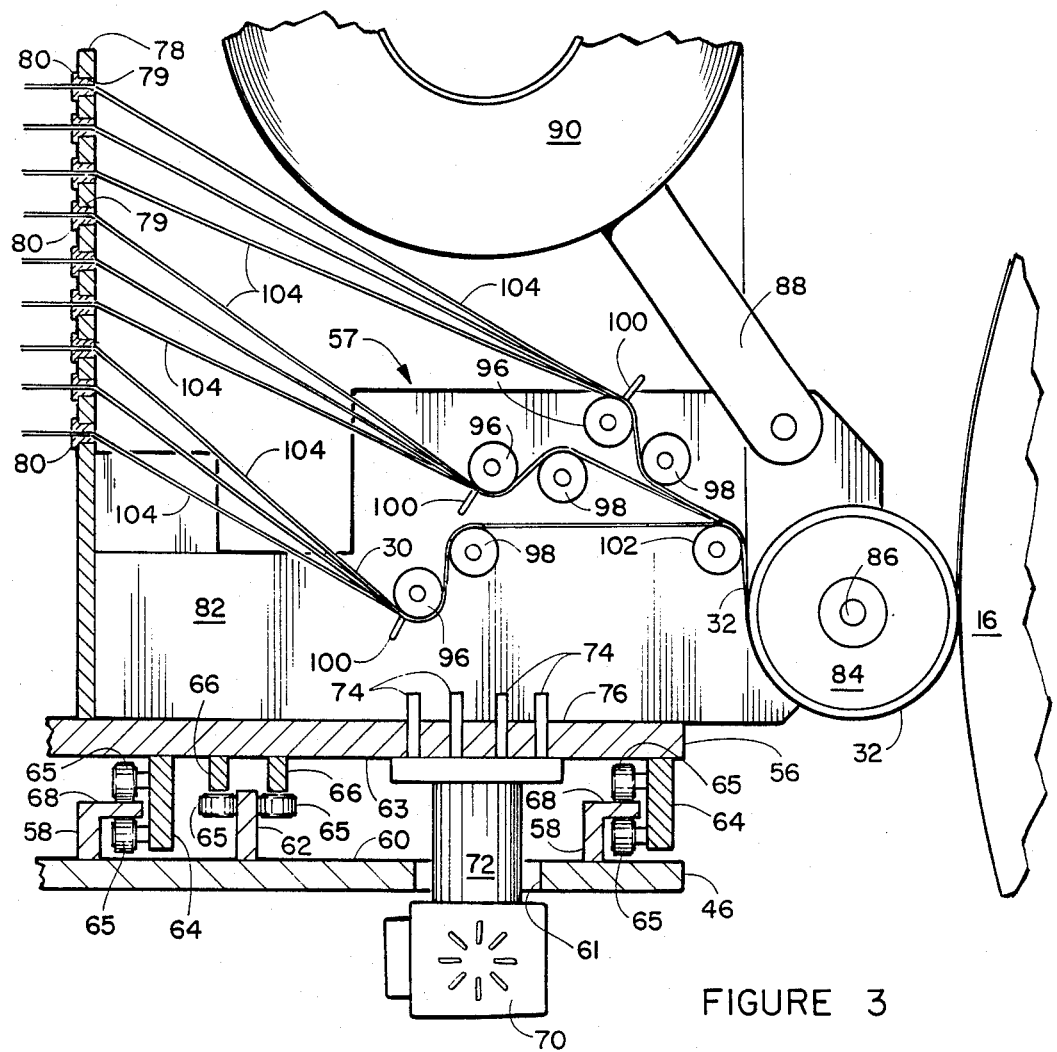
FIG. 3 is a more detailed showing of the payoff head support mechanism.

Referring now specifically to FIG. 3, on the upper surface of plate 46, guides and raceways are fixedly attached and positioned to allow the base plate 56 to rotate with ease relative to plate 46. A pair of inverted "L" shaped brackets 58 with their open side facing the mandrel 16 are located on the rear and front upper surfaces 60 of the mandrel plate 46. An upright wall member 62 is positioned between the two inverted "L" brackets adjacent to the rear inverted "L" bracket. Located between the wall member 62 and the forward most inverted "L" bracket 58 is an elongated accurate opening 61 through the plate 46.

Attached to the bottom surface 63 of the bracket 56 are a pair of downward extending walls 64 positioned forward of and adjacent to the inverted "L" shaped brackets 58 and a pair of walls 66 extending a somewhat shorter distance than 64 from the bottom surface 63. The distal end of each of the extending walls 64 include a pair of perpendicular rotatable guide wheels 65 which have a hard outer surface. Sandwich the end wall 68 of the inverted "L" bracket 58 therebetween. On the distal end of mounting blocks 66 a similar rotatable wheel is positioned. These rotatable wheels sandwich wall 62 therebetween. As will be more fully explained, these rotatable guide wheels and wall combination allow plate 56 to freely rotate relative to plate 46 and holds plate 56 in a substantially fixed positionable relationship with plate 46. Attached to the bottom surface 63 of plate 56 is a hot air type blower 70. The blower 70 is connected to the bottom surface 63 of plate 56 via manifold 72. Manifold 72 extends through the opening 61 of plate 46. A plurality of tubes 74 pass through plate 56 and extend above the upper surface 76 of the plate.

When the blower 70 is operated, hot air is directed upward through the manifold and out the tubes 74.

Figure 5:
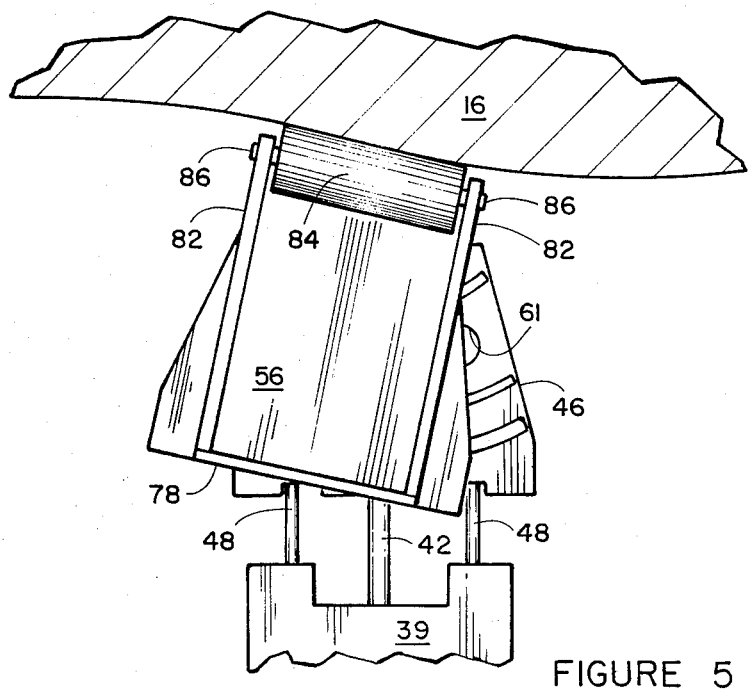
FIG. 5 is a plan view showing of a portion of FIG. 4 taken along line 5—5.
Figure 4:
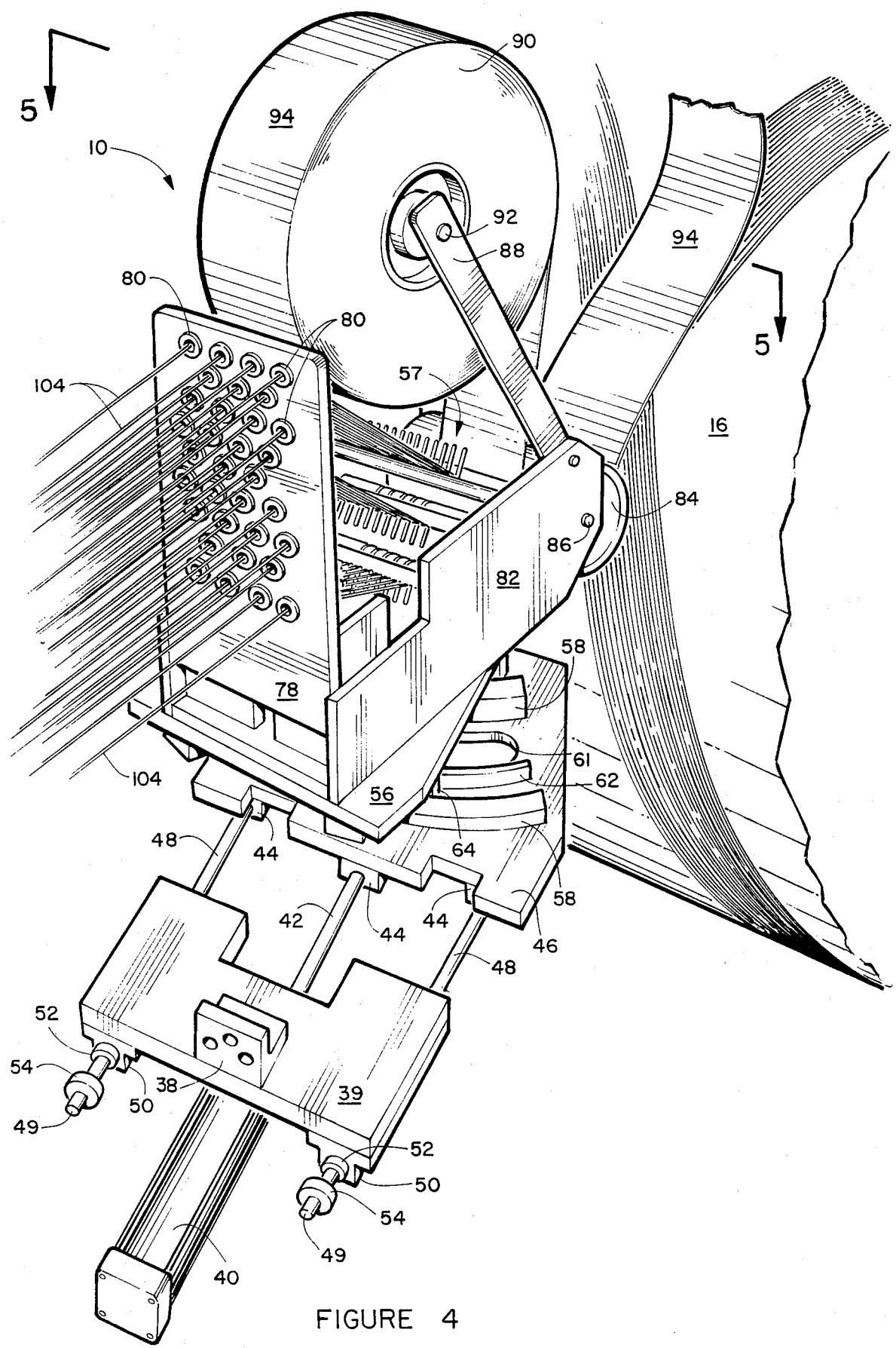
FIG. 4 is a perspective showing of the payoff head in operation against a mandrel.
Figure 6:
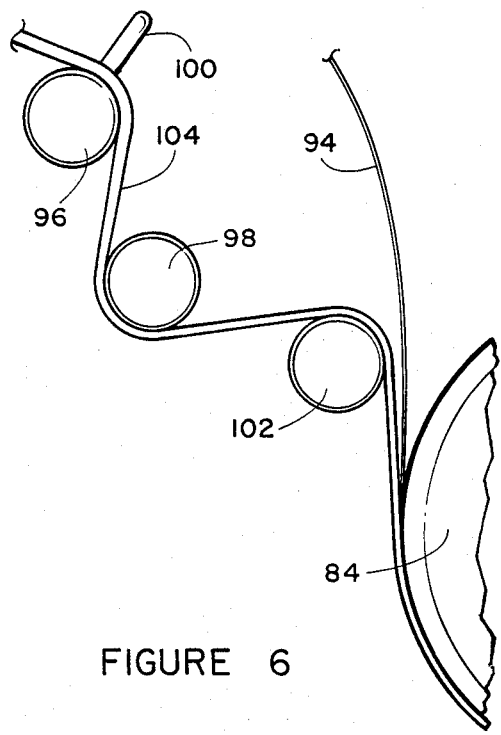
FIG. 6 is a schematic showing of the relative positions of one tier of tension bars, the gathering bar and the payoff roller.

Referring more specifically to FIGS. 3, 4 and 5, plate 56 forms the bottom surface of a housing 57. The rear of the housing is enclosed by an upright wall 78 having a plurality of apertures 79. Uniformly positioned there along as shown in FIG. 4. Each of the apertures 79 contain a smooth ceramic bushing or eyelet 80 therein. Connected to the wall 78 and bottom plate 56 are side walls 82. The combination of bottom plate, back and side walls provide a housing which is open on the top and front. A resilient guide roller 84 is rotatable about axle 86 and is positioned between the walls at the front open end of the housing 57. Adjacent the ends of the roller 84 and attached to walls 82 are a pair of brackets 88 (one shown). The brackets 88 support a rotatable reel 90 therebetween which is rotatably supported thereto via axle 92. The reel is designed to contain a tape material 94 the purpose of which is hereinafter discussed.

Also fixedly positioned between the walls 82 are three sets of bars. Each set of bars includes a comb bar 96 and plain bar 98. Each set is positioned at a different elevation. Each comb bar 96 has at least one row of tines 100 along its surface. Positioned to the right of the sets of combs and plain bars, in the FIGS. 2 and 3 showing, is a collection or forming bar 102 which is similar to plain bars 98.

Figure 1:
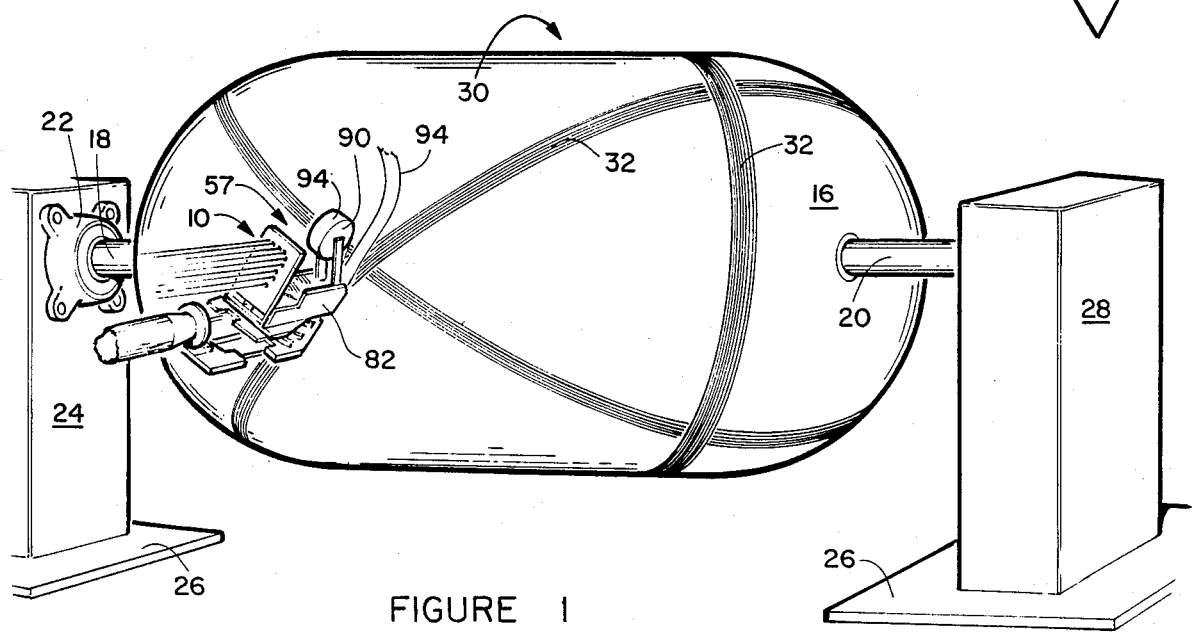
FIG. 1 is a perspective showing of the payoff head of the invention applying filaments to a rotating mandrel.
Figure 7:
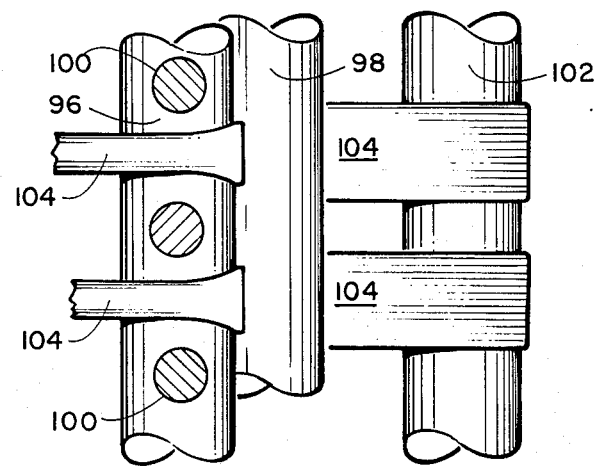
FIG. 7 is a partial plan view showing of the filament strands of a portion of one tier entering and exiting the tension bars.
Figure 8A:
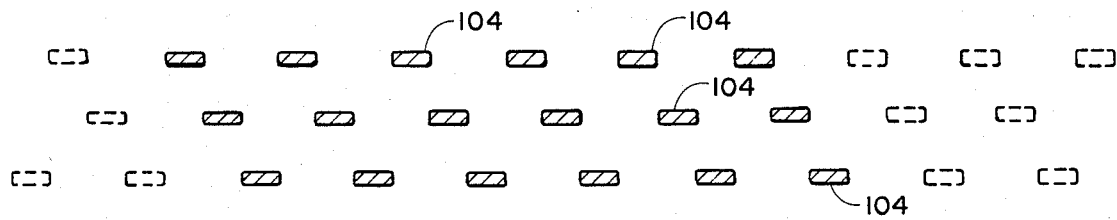
FIG. 8A is an end view of the filaments of FIG. 7 entering the tension bars.
Figure 8B:
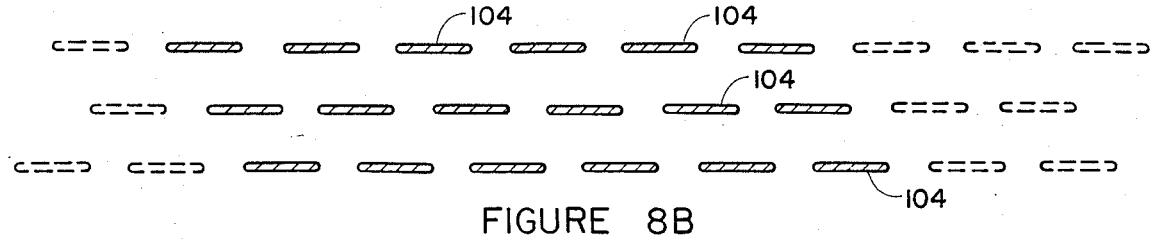
FIG. 8B is an end view of the filaments of FIG. 7 exiting the tension bars.
Figure 8C:
FIG. 8C is an end view of the filaments of FIG. 7 after they have been overlapped into a unitary gap-free band of filamentary strands.

Referring now more specifically to FIGS. 1-4 and 6-8C. A plurality of resin impregnated filament strands or tows 104 are fed from a suitable creel source, not shown, through the eyelets 80, across the sets of comb and plain bars onto the collection bar 102, partially around roller 84 and on to the mandrel 16 as shown in FIG. 1. These impregnated filaments are tensioned between the eyelets and mandrel. Referring now specifically to FIGS. 7, 8A and 8B, the filaments 104 are initially generally oval in cross-section and the comb and plain bar pair tend to flatten the filament to substantially twice its normal width. The positioning of the tines of the comb bar of each of the three sets of comb and plain bars positions the filaments as they enter the housing 57 as shown in FIG. 8A. As the filaments reach the collection bar 102 they continue to maintain a partially overlapped or shingled relative position as shown.

Inserted between the filaments and the roller 84 is a tape 94. The tape 94 can be plastic, paper or the like so long as it does not adhere to the roller 84 and is easily removable from filaments 104 as hereinafter discussed. The combination of the tape 94 and the overlapped filaments form the web or belt of filaments 32.

The tubes 74, see FIGS. 2 and 3, blow hot air on the filaments 104 during their travel across the bars. This hot air flow reduces the viscosity of the resin solution impregnating the filaments.

In operation the filaments are collected on the collection roller on the surface of the tape 94 forming an overlapped filament web or belt 32. The tape and the filament web or belt are applied to the outer surface of the mandrel as shown in FIG. 1. After approximately 180° of rotation of the mandrel, along arrow 30, after tape and filament application, the tape 94 is removed from the filament web or belt 32 and is discarded.

The actuator rod 42 is extended with pneumatic pressure. The winding machine computer controls the cross-feed arm translation and angulation. The computer control extends the cross-feed arm, and angles the cross-feed arm so that a predetermined pressure is applied between the roller 84 and the surface of the mandrel 16 at a proper roller angle (see FIG. 1). The computer controls for axes: (1) mandrel rotation, (2) carriage traverse; (3) cross-feed arm extension and retraction, and (4) rotation of the final payout head about the cross-feed axis. The pneumatic cylinder 40 is fitted with a two way regulator, so that the actuator rod 42 will maintain a constant pressure against the payout head as the payout head roller 84 rolls over the mandrel 16 surface. The cross-feed arm positions the payout head apparatus within the stroke length capability of the pneumatic cylinder.

With the proper pressure applied between the roller 84 and mandrel 16 the housing 57 is free to rotate horizontally to follow the outer contour of the mandrel 16. Continuous wrapping of the mandrel in this manner produces a superior structure.

It should be understood that various modifications and changes will be apparent to those skilled in the art from the foregoing description. Such modifications are deemed to be within the scope of the appended claims.

What is claimed is:

1. A method for producing fiber lamination on a rotating mandrel comprising:
   (a) providing a plurality of advanced composite filamentary tows, each tow comprised of a bundle of resin impregnated filaments;
   (b) positioning said tows into planar sets of spaced apart parallel tows at a relative positioning such that a gap free partially overlapped shingled unitary filamentary band will be formed after subsequent combining while flattening each of said tows to a configuration that is materially wider than its height;
   (c) combining said planar sets of flattened tows while maintaining said relative positioning to form said gap-free partially overlapped contacting shingled unitary filamentary band having a thickness that is at least twice the thickness of a single flattened tow; and
   (d) guiding said shingled gap free partially overlapped unitary filamentary band onto the receiving surface of said rotating mandrel having a predetermined contour whereby said band maintains its gap-free partially overlapped contacting shingled relationship and conforms to the contour of the receiving surface.

2. The method of claim 1 wherein said tows are positioned by providing a plurality of spaced apart combs, each comb having a plurality of tines with each tow being guided through a pair of tines.

3. The method of claim 1 wherein said tows are positioned by
   (i) positioning a plurality of combs each on a different level into a generally spaced apart relationship and
   (ii) guiding one group of tows through one comb to form one set of tows and guiding the remaining tows through at least one other comb to form another set of tows.

4. The method of claim 2 wherein said tows are positioned by
   (i) positioning a plurality of combs each on a different level into a generally spaced apart relationship: and
   (ii) guiding one group of tows through one comb to form one set of tows and guiding the remaining tows through at least one other comb to form another set of tows.

5. The method of claim 1 wherein said tows are flattened by
   guiding the sets of tows over a plurality of guide bars under sufficient tension to cause each tow to materially flatten.

6. The method of claim 2 wherein said tows are flattened by
   guiding the sets of tows over a plurality of guide bars under sufficient tension to cause each tow to materially flatten.

7. The method of claim 3 wherein said tows are flattened by
   guiding the sets of tows over a plurality of guide bars under sufficient tension to cause each tow to materially flatten.

8. The method of claim 4 wherein said tows are flattened by
   guiding the sets of tows over a plurality of guide bars under sufficient tension to cause each tow to materially flatten.

9. The method of claim 1 wherein said planar sets of flattened tows are combined by
   (i) guiding one set of flattened tows over a forming bar; and
   (ii) guiding at least one other set of flattened tows over the forming bar in a manner that the tows of each set partially overlap and form said gap-free partially overlapped shingled unitary filamentary band.

10. The method of claim 2 wherein
    (i) guiding one set of flattened tows over a forming bar; and
    (ii) guiding at least one other set of flattened tows over the forming bar in a manner that the tows of each set partially overlap and form said gap-free partially overlapped shingled unitary filamentary band.

11. The method of claim 3 wherein
    (i) guiding one set of flattened tows over a forming bar; and
    (ii) guiding at least one other set of flattened tows over the forming bar in a manner that the tows of each set partially overlap and form said gap-free partially overlapped shingled unitary filamentary band.

12. The method of claim 4 wherein said planar sets of flattened tows are combined by
    (i) guiding one set of flattened tows over a forming bar; and
    (ii) guiding at least one other set of flattened tows over the forming bar in a manner that the tows of each set partially overlap and form said gap-free partially overlapped shingled unitary filamentary band.

13. The method of claim 5 wherein said planar sets of flattened tows are combined by
    (i) providing a forming bar that is spaced apart and generally parallel to said guide bars;
    (ii) guiding one set of flattened tows over the forming bar; and
    (iii) guiding at least one other set of flattened tows over the forming bar in a manner that the tows of such sets partially overlap and form said gap-free partially overlapped shingled unitary filamentary band.

14. The method of claim 6 wherein said planar sets of flattened tows are combined by
    (i) providing a forming bar that is spaced apart and generally parallel to said guide bars;

(ii) guiding one set of flattened tows over the forming bar; and (iii) guiding at least one other set of flattened tows over the forming bar in a manner that the tows of such sets partially overlap and form said gap-free partially overlapped shingled unitary filamentary band.

15. The method of claim 7 wherein said planar sets of flattened tows are combined by (i) providing a forming bar that is spaced apart and generally parallel to said guide bars;

(ii) guiding one set of flattened tows over the forming bar; and (iii) guiding at least one other set of flattened tows over the forming bar in a manner that the tows of such sets partially overlap and form said gap-free partially overlapped shingled unitary filamentary band.

16. The method of claim 8 wherein said planar sets of flattened tows are combined by (i) providing a forming bar that is spaced apart and generally parallel to said forming bars;

(ii) guiding one set of flattened tows over the forming bar; and (iii) guiding at least one other set of flattened tows over the forming bar in a manner that the tows of such sets partially overlap and form said gap-free partially overlapped shingled unitary filamentary band.

17. The method of claim 1 wherein the unitary filament band is guided onto the mandrel by (i) providing a resilient guide roller adapted to generally conform to the contour of said rotating mandrel surface; and (ii) guiding the unitary filamentary band over the guide roller in a manner that the roller applies the unitary filamentary band to said rotating mandrel.

18. The method of claim 2 wherein the unitary filament band is guided onto the mandrel by (i) providing a resilient guide roller adapted to generally conform to the contour of said rotating mandrel; and (ii) guiding the unitary filamentary band over the guide roller in a manner that the roller applies the unitary filamentary band to said rotating mandrel.

19. The method of claim 3 wherein the unitary filament band is guided onto the mandrel by (i) providing a resilient guide roller adapted to generally conform to the contour of said rotating mandrel; and (ii) guiding the unitary filamentary band over the guide roller in a manner that the roller applies the unitary filamentary band to said rotating mandrel.

20. The method of claim 4 wherein the unitary filament band is guided onto the mandrel by (i) providing a resilient guide roller adapted to generally conform to the contour of said rotating mandrel; and (ii) guiding the unitary filamentary band over the guide roller in a manner that the roller applies the unitary filamentary band to said rotating mandrel.

21. The method of claim 5 wherein the unitary filament band is guided onto the mandrel by (i) providing a resilient guide roller adapted to generally conform to the contour of said rotating mandrel; and (ii) guiding the unitary filamentary band over the guide roller in a manner that the roller ap[plies the unitary filamentary band to said rotating mandrel.

22. The method of claim 6 wherein the filament band is guided onto the mandrel by (i) providing a resilient guide roller adapted generally conform to the contour of said rotating mandrel; and (ii) guiding the unitary filamentary band over the guide roller in a manner that the roller applies the unitary filamentary band to said rotating mandrel.

23. The method of claim 7 wherein the filament band is guided onto the mandrel by (i) providing a resilient guide roller adapted to generally conform to the contour of said rotating mandrel; and (ii) guiding the unitary filamentary band over the guide roller in a manner that the roller applies the unitary filamentary band to said rotating mandrel.

24. The method of claim 8 wherein the filament band is guided onto the mandrel by (i) providing a resilient guide roller adapted to generally conform to the contour of said rotating mandrel; and (ii) guiding the unitary filamentary band over the guide roller in a manner that the roller applies the unitary filamentary band to said rotating mandrel.

25. The method of claim 9 wherein the filament band is guided onto the mandrel by (i) providing a resilient guide roller adapted to generally conform to the contour of said rotating mandrel; and (ii) guiding the unitary filamentary band over the guide roller in a manner that the roller applies the unitary filamentary band to said rotating mandrel.

26. The method of claim 10 wherein the filament band is guided onto the mandrel by (i) providing a resilient guide roller adapted to generally conform to the contour of said rotating mandrel; and (ii) guiding the unitary filamentary band over the guide roller in a manner that the roller applies the unitary filamentary band to said rotating mandrel.

27. The method of claim 11 wherein the filament band is guided onto the mandrel by (i) providing a resilient guide roller adapted to generally conform to the contour of said rotating mandrel; and (ii) guiding the unitary filamentary band over the guide roller in a manner that the roller applies the unitary filamentary band to said rotating mandrel.

28. The method of claim 12 wherein the filament band is guided onto the mandrel by (i) providing a resilient roller adapted to generally conform to the contour of said rotating mandrel; and (ii) guiding the unitary filamentary band over the guide roller in a manner that the roller applies the unitary filamentary band to rotating mandrel.

29. The method of claim 13 wherein the filament band is guided onto the mandrel by (i) providing a resilient guide roller adapted to generally conform to the contour of said rotating mandrel; and (ii) guiding the unitary filamentary band over the guide roller in a manner that the roller applies the unitary filamentary band to said rotating mandrel.

30. The method of claim 14 wherein the filament band is guided onto the mandrel by
 (i) providing a resilient guide roller adapted to generally conform to the contour of said rotating mandrel; and
 (ii) guiding the unitary filamentary band over the guide roller in a manner that the roller applies the unitary filamentary band to said rotating mandrel.

31. The method of claim 15 wherein the filament band is guided onto the mandrel by
 (i) providing a resilient guide roller adapted to generally conform to the contour of said rotating mandrel; and
 (ii) guiding the unitary filamentary band over the guide roller in a manner that the roller applies the unitary filamentary band to said rotating mandrel.

32. The method of claim 16 wherein the filament band is guided onto the mandrel by
 (i) providing a resilient guide roller adapted to generally conform to the contour of said rotating mandrel; and
 (ii) guiding the unitary filamentary band over the guide roller in a manner that the roller applies the unitary filamentary band to said rotating mandrel.

33. The method of claim 32 wherein the guide roller is urged against said rotating mandrel with a predetermined force.

34. The method of claim 33 further comprising the steps of:
 (i) providing a source of tape medium;
 (ii) guiding the tape medium between the guide roller and the unitary filamentary band so that as the guide roller applies the filamentary band to said rotating mandrel the tape medium is positioned on the surface of the band opposite to that applied to said rotating mandrel; and
 (iii) removing the tape medium from the filamentary band after the band has been supplied to said rotating mandrel.

35. The method of claim 34 comprising the further step of:
 (i) providing a cross-feed arm for applying said gap-free partially overlapped shingled unitary filament band onto said rotating mandrel; and
 (ii) providing a controlled relative rotary and linear motion between said rotating mandrel and said cross-feed arm to thereby precisely position the partially overlapped shingled unitary filament band onto said rotating mandrel.

36. The method of claim 1 wherein the tows are impregnated with a heat setting resinous binder, the method comprising the further step of:
 heating the tows to reduce the viscosity of the heat resinous binder.

37. The method of claim 1 wherein said positioning includes guiding said tows into at least three planar sets of spaced apart parallel tows having a
 (i) providing a resilient guide roller adapted to generally conform to the contour of said rotating mandrel; and
 (ii) guiding the unitary filamentary band over the guide roller in a manner that the roller applies the unitary filamentary band to said rotating mandrel.

* * * * *